Nov. 5, 1929.  C. FIORE  1,734,667
HOT WATER TABLE
Filed Feb. 14, 1928   2 Sheets-Sheet 1

Inventor
Carmine Fiore,
By Clarence A. O'Brien
Attorney

Nov. 5, 1929.     C. FIORE     1,734,667
HOT WATER TABLE
Filed Feb. 14, 1928     2 Sheets-Sheet 2

Inventor
Carmine Fiore,
By Clarence A. O'Brien
Attorney

Patented Nov. 5, 1929

1,734,667

UNITED STATES PATENT OFFICE

CARMINE FIORE, OF NEW YORK, N. Y.

HOT-WATER TABLE

Application filed February 14, 1928. Serial No. 254,194.

This invention relates to new and useful improvements in hot water tables for use in restaurants, hotels, boarding houses and the like, and aims to provide a construction consisting generally of a hollow metallic table construction for receiving a supply of water while arranged within the center of this table is a water protected heating unit whereby the water within the table can be maintained at a predetermined temperature, said table being constructed for receiving relatively large food vessels for submergence in the heated water as well as for receiving a coffee container for disposition within the table above the burner for the obvious result of maintaining the coffee and food in a hot condition after the proper brewing of the coffee and cooking of the food.

A most important object of this invention is to provide a hot water table that may be arranged behind a restaurant counter so that the food and coffee may be served directly to the customers, the construction of the device being such as to provide an attractive fixture for the restaurant.

A further and important object is to provide a hot water table of this character that is extremely simple in construction and inexpensive of manufacture and that may be operated at unusually low cost.

With the foregoing and other objects in view as the nature of the invention will be better understood, the same comprises the novel form, combination and arrangement of parts hereinafter more fully described, shown in the accompanying drawings and claimed.

In the drawings wherein like reference characters indicate corresponding parts throughout the several views.

Figure 1:
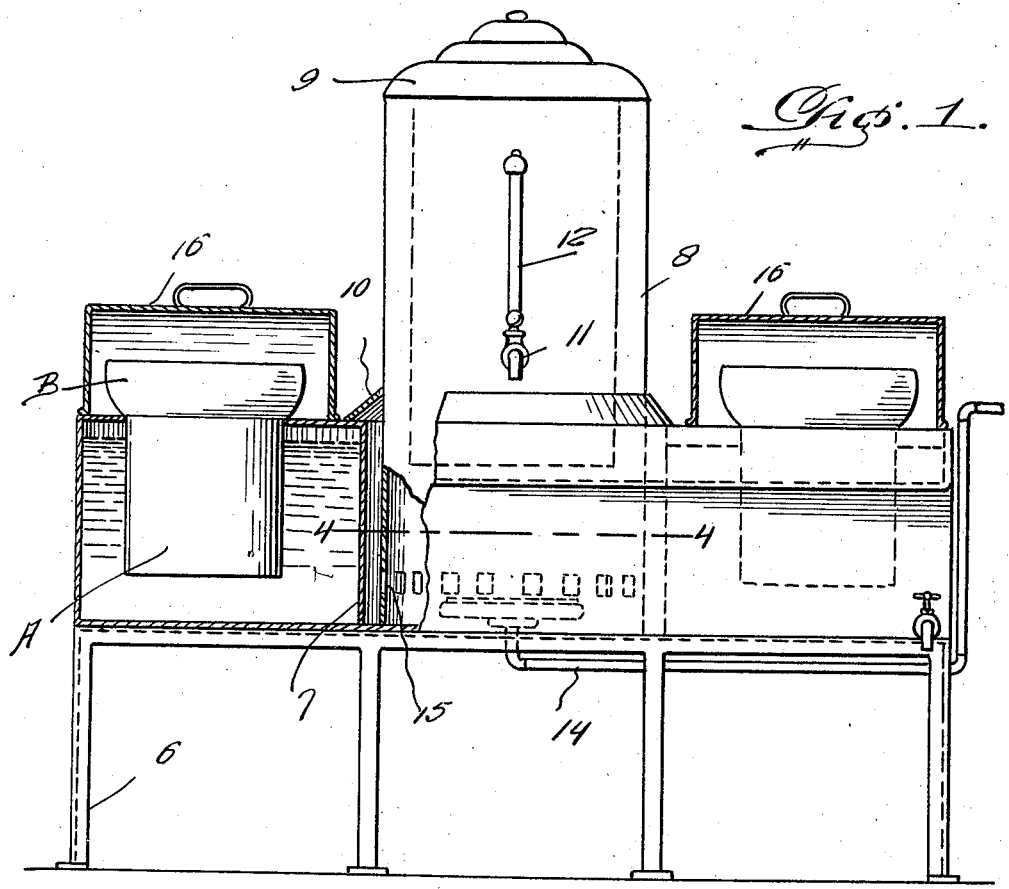
Figure 1 is a view partially in front elevation and partially in cross section of my improved hot water table.
Figure 4:
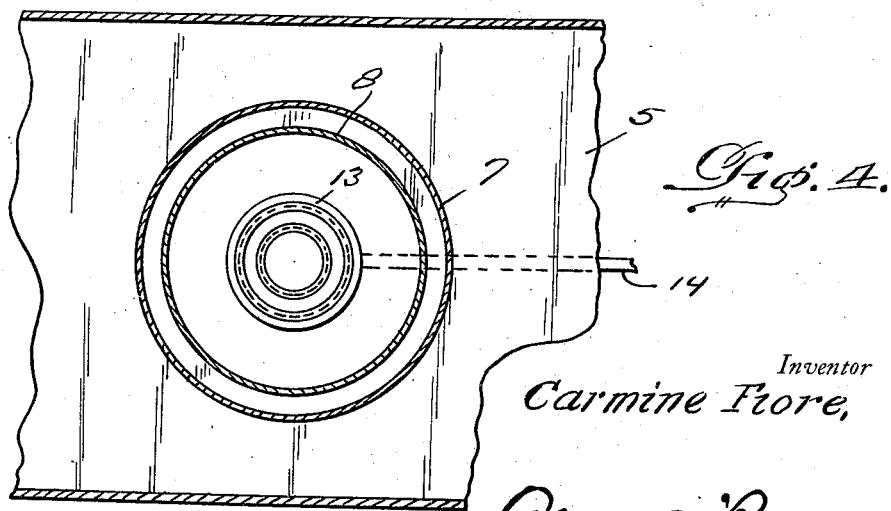
Figure 4 is an enlarged fragmentary horizontal section taken substantially upon the line 4—4 of Figure 1.
Figure 2:
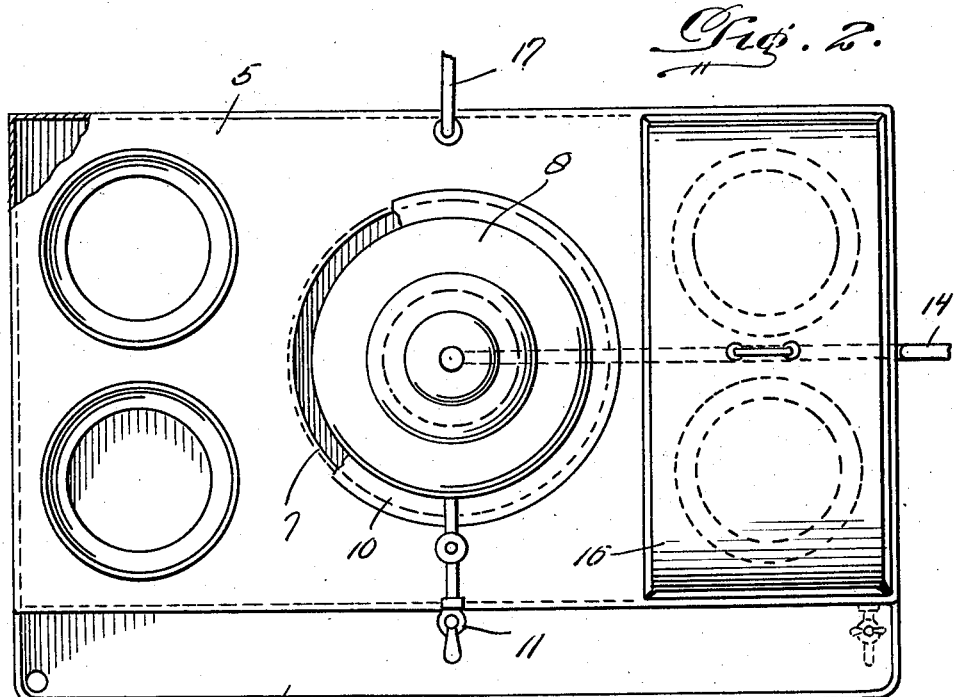
Figure 2 is a top plan view thereof partially in cross section, the cover lid for the food containers at one end of the table being removed.
Figure 3:
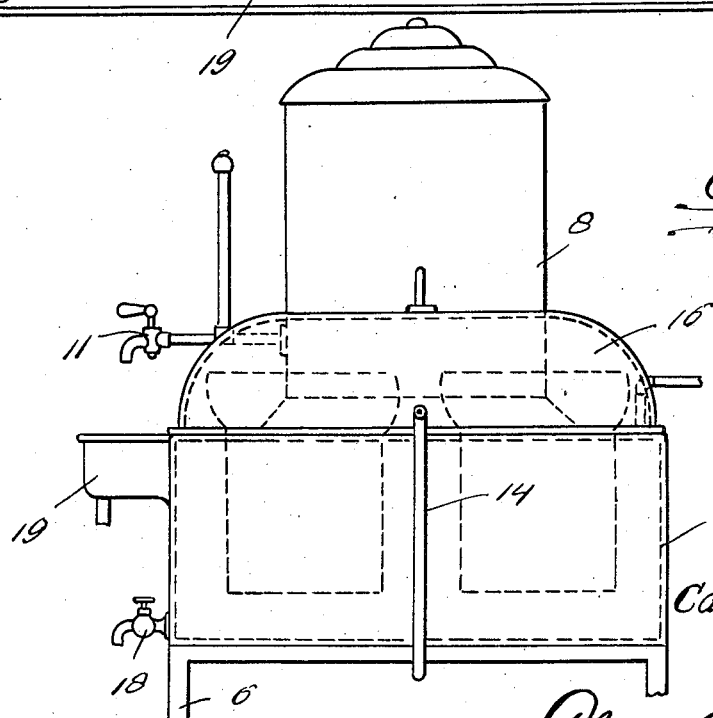
Figure 3 is an end elevation of the table.

Now having particular reference to the drawings, my novel invention consists of a hollow metallic table body 5 of predetermined capacity and equipped at its bottom wall with a depending supporting leg structure 6. Formed centrally of this hollow table structure 5 is a circular compartment 7 open at its upper end and adapted to receive the lower end of a metallic coffee urn 8 having a suitable lid 9. Arranged around the upper end of the circular compartment 7 is an inclined annulus 10 adapted to closely contact at its inner edge the said urn for providing a relatively tight joint between the urn and the table. The interior of this urn is so constructed as to provide a coffee chamber suggested by the dotted lines in Figure 1, while leading from the urn and having communication with the coffee chamber is a suitable faucet 11, a level gage 12 being also provided if desired.

Arranged within the compartment 7 of said table directly above the bottom wall thereof and centrally therein is an oil or gas burner 13 having communication with a source of fuel supply through the medium of a fuel line 14 attached to the exterior of the table.

Adjacent the lower end of the metallic urn body 8 the same is formed with heat escape openings 15 so that the heat from the burner may contact the wall forming the compartment to permit the same to dissipate into the table body 5.

The top wall of the table body 5 is provided with a plurality of circular openings preferably arranged in pairs whereby food vessels A may be arranged therein, these food vessels having flanges or wide necks B at their upper ends for engagement upon the top wall of the table to support the vessel within the opening as clearly disclosed in Figure 1 of the drawings.

Furthermore, a suitable lid 16 is provided for arrangement over each pair of vessels so as to protect the same against dirt, dust or other foreign matter.

Leading into the table body is a water supply pipe 17 whereby the body may be completely charged with a supply of water, which water will become thoroughly heated by the presence of the burner 13 for thus maintaining the food in the vessels A in hot condition. At the front wall of the table there is arranged a hot water faucet 18 so that hot water may be drained therefrom whenever necessary.

Preferably the front wall of the table directly beneath the upper surface thereof is formed with a longitudinal trough 19 so that coffee dripping from the faucet will be caught therein.

It will thus be seen that I have provided a simple and extremely useful hot water table that is well adapted for all the purposes hereinbefore designated, even though I have herein shown and described the invention as consisting of certain detail structural elements, it is nevertheless to be understood that minor changes may be made therein without affecting the spirit and scope of the appended claim.

Having thus described the invention, what I claim as new and desire to secure by Letters Patent is:—

In a heating table of the character described, a horizontal water chamber having openings in the top thereof whereby to permit food vessels to be arranged therein, a circular partition disposed centrally within the chamber and being open at its top, heat generating means located within said partition, and a coffee urn adapted to be arranged within said partition, the said urn being open at its bottom end for surrounding said heat generating means and being formed with openings communicating with the space between the urn and the circular partition.

In testimony whereof I affix my signature.

CARMINE FIORE.